United States Patent
Voetter et al.

(10) Patent No.: US 8,342,816 B2
(45) Date of Patent: Jan. 1, 2013

(54) ENGINE-DRIVEN HYDRAULIC PUMP

(75) Inventors: Axel Voetter, Rosengarten (DE); Ulrich Mueller, Weyhe (DE)

(73) Assignee: Airbus Operations GmbH, Hamburg (DE)

( * ) Notice: Subject to any disclaimer, the term of this patent is extended or adjusted under 35 U.S.C. 154(b) by 71 days.

(21) Appl. No.: 12/841,797

(22) Filed: Jul. 22, 2010

(65) Prior Publication Data

US 2011/0011471 A1 Jan. 20, 2011

Related U.S. Application Data

(63) Continuation of application No. PCT/EP2009/051007, filed on Feb. 7, 2008.

(60) Provisional application No. 61/063,905, filed on Feb. 7, 2008.

(30) Foreign Application Priority Data

Feb. 7, 2008 (DE) .................... 10 2008 007 840

(51) Int. Cl.
*F04B 27/08* (2006.01)
(52) U.S. Cl. ............ 417/269; 417/271; 60/484; 60/486; 91/472
(58) Field of Classification Search ............... 417/222.1, 417/222.2, 269; 91/472; 60/484, 486
See application file for complete search history.

(56) References Cited

U.S. PATENT DOCUMENTS

| 3,440,965 | A | | 4/1969 | Raymond |
| 4,143,996 | A | * | 3/1979 | Sullivan ........................... 417/15 |
| 4,754,940 | A | * | 7/1988 | Deter ........................... 244/75.1 |
| 5,957,666 | A | | 9/1999 | Lee |
| 7,377,105 | B1 | * | 5/2008 | Raymond ........................ 60/486 |

FOREIGN PATENT DOCUMENTS

| DE | 6805377 U | 2/1969 |
| DE | 1949612 A1 | 4/1971 |
| DE | 2903412 C2 | 8/1980 |
| DE | 19755661 | 9/1998 |
| DE | 102004031093 | 1/2006 |
| EP | 1657102 A | 5/2006 |
| GB | 865 648 A | 4/1961 |

OTHER PUBLICATIONS

German Office Action for DE 10 2008 007 840.9 dated Apr. 3, 2009.
International Search Report for PCT/EP2009/051007 dated Jun. 2, 2009.

* cited by examiner

*Primary Examiner* — Charles Freay
*Assistant Examiner* — Patrick Hamo
(74) *Attorney, Agent, or Firm* — Jenkins, Wilson, Taylor & Hunt, P.A.

(57) ABSTRACT

Engine-driven hydraulic pump for an aircraft, having a first and a second pump unit which each comprise an adjustable swash plate and a piston assembly coupled with said swash plate and driven by a pump shaft, a control device for adjusting the inclination of the swash plate and a drive shaft via which the hydraulic pump can be driven by an engine of the aircraft while generating hydraulic pressure at an outlet line, characterized in that the pump units are arranged in parallel and have a respective pump shaft, which pump shafts are coupled with the drive shaft by a gear unit.

6 Claims, 2 Drawing Sheets

ENGINE-DRIVEN HYDRAULIC PUMP

CROSS-REFERENCE TO RELATED APPLICATIONS

This application is a continuation of PCT/EP2009/051007 and claims the benefit of U.S. Provisional Application No. 61/063,905, filed Feb. 7, 2008 and German Patent Application No. 10 2008 007 840.9, filed Feb. 7, 2008, the entire disclosures of which are herein incorporated by reference.

FIELD OF THE INVENTION

The invention relates to an engine-driven hydraulic pump for an aircraft.

Engine-driven hydraulic pumps (EDP) of the prior art are mostly axial piston pumps which transfer mechanical power provided at a rotating drive shaft into hydraulic power. In this respect, pistons arranged in an axial direction with respect to the drive shaft are moved backwards and forwards in a translatory manner via a swash plate by the shaft driven by the engine of the aircraft. A hydraulic fluid is drawn up by suction by this stroke movement and is fed under high pressure into a hydraulic circuit. The swash plate is mounted pivotally and can be established in its inclination by a control piston pressurised by the high pressure side of the pump for the purpose of changing the piston stroke. If a high pressure prevails at the pump outlet, the swash plate is pivoted back against a spring in the direction of its zero position, so that the stroke of the pistons becomes minimal and the pump does not deliver or delivers only minimally. On the other hand, if a low pressure prevails at the outlet of the pump, the spring pivots the swash plate so that a greater or maximum stroke is produced and thus a greater or maximum pump capacity is produced.

If axial piston pumps of this type are to realise high volume flows, the pistons and piston stroke have to be increased. Since, in so doing, the dynamic forces of gravity will also increase, the drive speed of the pump has to be reduced in order to rule out any damage to the pump by excessive dynamic loads. However, a reduction in the speed also results in a reduction in the delivery rate of the pump. One possibility of realising high volume flows simultaneously with a high speed is the use of two smaller pump units which are driven by one drive shaft. As a result of the shorter strokes and smaller swash plate diameter, the dynamic forces are also correspondingly lower, so that high volume flows can be realised with relatively small assemblies. A known construction by Bosch Rexroth provides two pump units with in each case a swash plate, piston and control piston which are arranged in a row on a drive shaft. With this arrangement, the delivery volume of a conventional pump is doubled, while the speed can be kept at the same level. However, due to the fact that the pump units are arranged in a row, this known construction has a considerable construction length, which is a disadvantage for some applications. While the hydraulic power requirement for large modern transport aircraft and thus also the required volume flow of engine-driven hydraulic pumps is progressively increasing, the available installation space is generally restricted. In particular, the length of the pumps is often problematic, because in some types of engine, the pumps have to be installed transversely to the longitudinal axis of the engine for technical reasons. In the known hydraulic pumps which have two pump units arranged in a row, a pump installation transverse to the longitudinal axis of the engine results in a very expansive construction which is difficult to realise and often extends beyond the predetermined installation space.

SUMMARY OF THE INVENTION

The object of the invention is to provide an engine-driven hydraulic pump which, with a compact construction method, produces a high volume flow.

The object is achieved by an engine-driven hydraulic pump which has the features of claim 1.

Advantageous developments and configurations of the hydraulic pump according to the invention are the subject of the subclaims.

The invention provides an engine-driven hydraulic pump for an aircraft, which hydraulic pump has a first and second pump unit which each comprise an adjustable swash plate and a piston assembly coupled with the swash plate and driven by a pump shaft, a control device for adjusting the inclination of the swash plate and a drive shaft via which the hydraulic pump can be driven by an engine of the aircraft, while generating hydraulic pressure at an outlet line. The invention provides that the pump units are arranged in parallel and each have a pump shaft, which pump shafts are coupled with the drive shaft via a gear unit.

A fundamental advantage of the engine-driven hydraulic pump according to the invention is that by using two small, fast operating pump units which are arranged in parallel, it is possible to realise high volume flows, without the length and thus the necessary installation space being significantly reduced compared to a conventional single axial piston pump.

According to an embodiment of the invention, the gear unit which couples the pump shaft with the drive shaft is formed by a spur gear.

A further embodiment of the invention provides that the swash plates of the parallel pump units can be adjusted by a single control device coupled with each of the swash plates. The use of a single control or regulating device for both pump units means that, compared to conventional axial piston pumps, a reduction in weight is advantageously to be expected with the same power.

The control device can be formed in particular by a control piston.

The control piston can be coupled with the output power of the hydraulic pump by a control line.

An embodiment of the invention provides that the pump units are arranged in a common housing. Arranging the pump units in a common housing entails an advantageous reduction in weight.

An embodiment of the invention provides that each pump unit has a respective outlet line, which outlet lines are combined in the housing of the hydraulic pump into a common outlet line.

Furthermore, it can be provided that each pump unit has a respective suction line, which suction lines branch off in the housing from a common suction line.

A further embodiment of the invention provides that the pistons of the first and second piston assemblies are in an offset arrangement with respect to one another for the purpose of minimising pressure pulsations. Thus, there results a phase shift of the pressure peaks released by the piston assemblies of the respective pump units, which leads to an advantageous reduction in the pressure pulsations at the outlet line.

DESCRIPTION OF EXEMPLARY EMBODIMENTS

In the following, an embodiment of the invention will be described with reference to the drawings.

Figure 1:
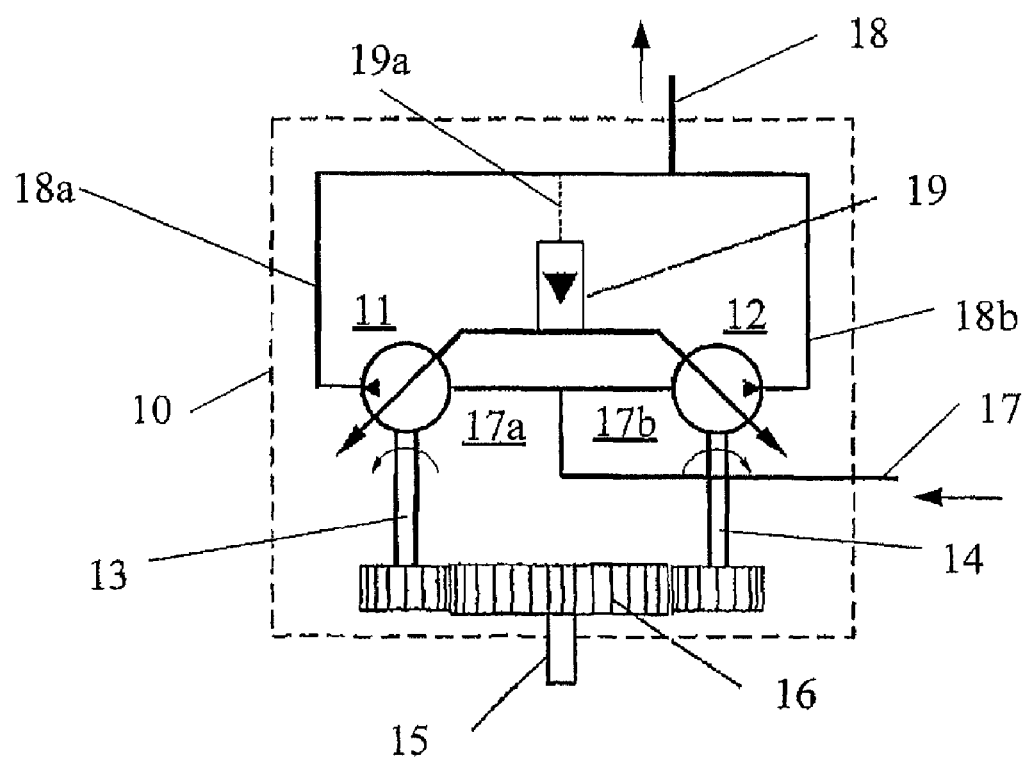
FIG. 1 shows a simplified diagram of an engine-driven hydraulic pump for the hydraulic system of an aircraft according to an embodiment of the invention.

The illustrated engine-driven hydraulic pump comprises a first pump unit 11 and a second pump unit 12 which each comprise an adjustable swash plate, not shown specifically in FIG. 1, and a piston assembly which is driven by a respective pump shaft 13 or 14 and is also not shown specifically. The type and construction of the pump units as such are known from the prior art. A control device 19 serves to adjust the inclination of the swash plate and thus of the volume flow which is conveyed by the pump and is available at an outlet line 18. The hydraulic pump is driven by a drive shaft 15 of an engine, not shown in the figure, of an aircraft.

The pump units 11, 12 each having a pump shaft 13, 14 are arranged in parallel in a common housing 10 and are jointly coupled with the drive shaft 15 by a gear unit 16. In the embodiment shown in FIG. 1, the gear unit 16 coupling the pump shafts 13, 14 with the drive shaft 15 is formed by a spur gear, such that the two pump shafts 13, 14 are also arranged parallel to one another in the geometric sense.

To adjust the inclination of the swash plates of the two pump units 11, 12, a common single control and regulating device is provided which comprises a control piston 19 which is coupled with the outlet line 18 of the hydraulic pump by a control line 19a.

Each pump unit 11, 12 has its own respective outlet line 18a, 18b, which lines are combined in the housing 10 of the hydraulic pump into a common outlet line 18. Similarly, each pump unit 11, 12 also has a respective suction line 17a, 17b, which suction lines branch off from a common suction line 17 in the housing 10.

In the illustrated engine-driven hydraulic pump, the two pump units 11, 12 are not arranged on a common drive shaft, as in the known hydraulic pump described at the outset, but they each have their own pump shafts 13, 14 which are driven by a gear unit 16. The installation principle of conventional hydraulic pumps as such remains the same. The suction line 17 supplies fluid to the pump, this volume flow is only divided up into the respective individual lines 17a, 17b when it is inside the housing 10 and supplies both pump units 11, 12. The conveyed flows of both pump units 11, 12 are re-combined by the individual outlet lines 18a, 18b in the housing 10 and are discharged via the common outlet line 18. In contrast to conventional pumps, in the illustrated embodiment the swash plates of both pump units 11, 12 are pivoted outwards by a single common control piston 19 which is actuated by the common high pressure side 18. This ensures that both pump units 11, 12 are operated under substantially the same load.

Figure 2:
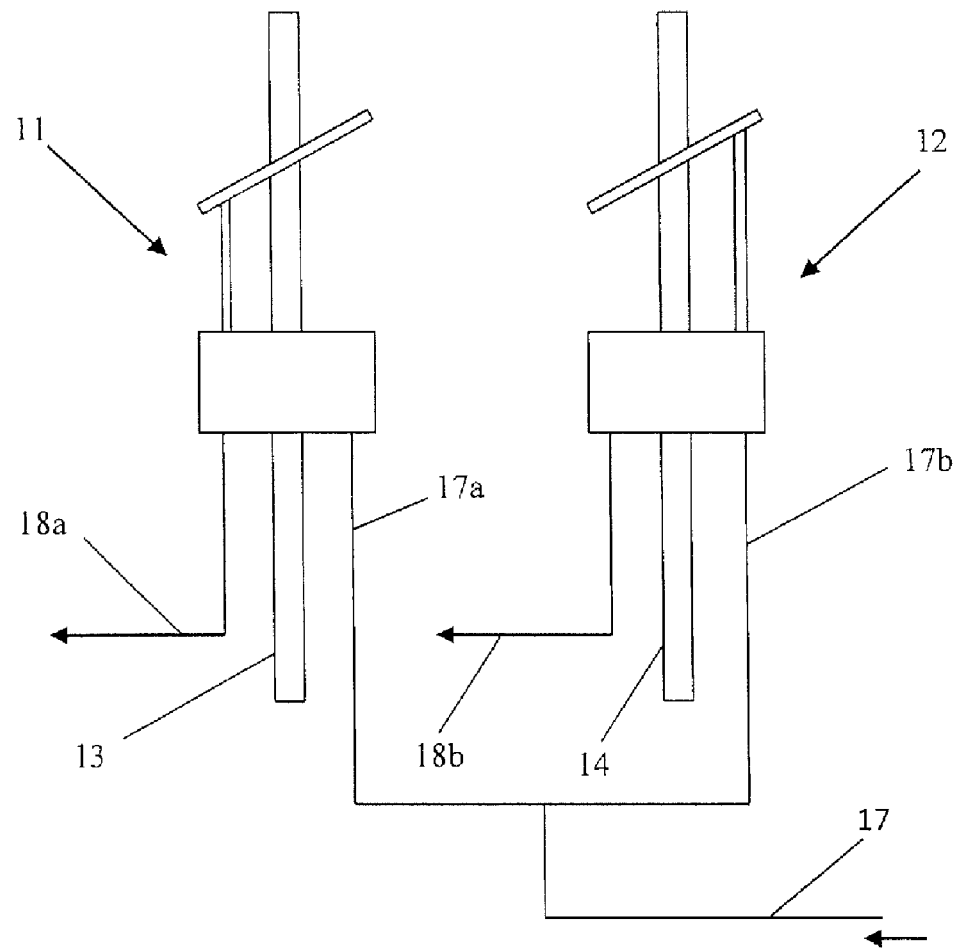
FIG. 2 show a simplified diagram of the relative piston configurations for two pump units according to an embodiment of the invention.

Due to the principle involved, each piston stroke of the respective piston assembly causes a pressure surge in the outlet lines 18a, 18b which correspondingly produce a pulsating volume flow at the common outlet line 18. It is possible to reduce these pulsations by arranging the respective piston assemblies of the two pump units 11, 12 such that they are rotated about their longitudinal axis relative to one another, such that the conveying pistons, which displace the fluid, of one assembly are arranged offset relative to the pistons, displacing the fluid, of the second assembly. An example of such a configuration is shown in FIG. 2.

List of Reference Numerals 10 housing
11 pump unit
12 pump unit
13 pump shaft
14 pump shaft
15 drive shaft
16 gear unit
17, 17a, 17b suction line
18, 18a, 18b outlet line
19 control piston
19a control line

The invention claimed is:

1. An engine-driven hydraulic pump for an aircraft, comprising:
   a first pump unit and a second pump unit;
   wherein each pump unit comprises:
      an adjustable swash plate,
      a piston assembly coupled with said swash plate and driven by a pump shaft,
      a control piston for adjusting the inclination of said swash plate, and
      a drive shaft via which the hydraulic pump can be driven by an engine of the aircraft while generating hydraulic pressure at an outlet line,
   wherein the pump units are arranged in parallel and the pump shafts are coupled with the drive shaft by a gear unit,
   wherein said swash plates of the pump units are adjustable by a single control piston, coupled with said swash plates, to operate the pump units under substantially the same load, and
   wherein the pistons of each piston assembly are in an offset position relative to one another.

2. The hydraulic pump according to claim 1, wherein the gear unit coupling the pump shafts with the drive shaft is formed by a spur gear.

3. The hydraulic pump according to claim 1, wherein the control piston is coupled with the outlet line of the hydraulic pump by a control line.

4. The hydraulic pump according to claim 1, wherein the pump units are arranged in a common housing.

5. The hydraulic pump according to claim 4, wherein each pump unit has a respective outlet line, and wherein the outlet lines are combined into a common outlet line in the common housing of the hydraulic pump.

6. The hydraulic pump according to claim 5, wherein each pump unit has a respective suction line, and the suction lines branch of from a common suction line in the common housing.

* * * * *

UNITED STATES PATENT AND TRADEMARK OFFICE
CERTIFICATE OF CORRECTION

PATENT NO. : 8,342,816 B2  
APPLICATION NO. : 12/841797  
DATED : January 1, 2013  
INVENTOR(S) : Axel Voetter et al.

Page 1 of 1

It is certified that error appears in the above-identified patent and that said Letters Patent is hereby corrected as shown below:

On title page, item 63 under Related U.S. Application Data
replace "Feb. 7, 2008"
with --January 29, 2009--.

Signed and Sealed this
Nineteenth Day of March, 2013

Teresa Stanek Rea
*Acting Director of the United States Patent and Trademark Office*